United States Patent
Mumick et al.

(10) Patent No.: US 8,571,606 B2
(45) Date of Patent: Oct. 29, 2013

(54) SYSTEM AND METHOD FOR PROVIDING MULTI-MODAL BOOKMARKS

(75) Inventors: Inderpal Singh Mumick, Berkeley Heights, NJ (US); Sandeep Sibal, Scotch Plains, NJ (US)

(73) Assignee: Waloomba Tech Ltd., L.L.C., Wilmington, DE (US)

( * ) Notice: Subject to any disclaimer, the term of this patent is extended or adjusted under 35 U.S.C. 154(b) by 0 days.

(21) Appl. No.: 13/491,465

(22) Filed: Jun. 7, 2012

(65) Prior Publication Data
US 2012/0244846 A1    Sep. 27, 2012

Related U.S. Application Data

(63) Continuation of application No. 10/211,117, filed on Aug. 2, 2002, now Pat. No. 8,238,881.

(60) Provisional application No. 60/310,610, filed on Aug. 7, 2001.

(51) Int. Cl.
*H04W 4/00* (2009.01)

(52) U.S. Cl.
USPC ........................................ 455/566; 455/414.1

(58) Field of Classification Search
USPC ........ 455/414.1, 466, 566; 707/723, 736, 754
See application file for complete search history.

(56) References Cited

U.S. PATENT DOCUMENTS

| | | | |
|---|---|---|---|
| 5,828,468 A | 10/1998 | Lee et al. | |
| 5,844,979 A | 12/1998 | Raniere et al. | |
| 5,944,791 A | 8/1999 | Scherpbier | |
| 6,018,710 A | 1/2000 | Wynblatt et al. | |
| 6,101,510 A | 8/2000 | Stone et al. | |
| 6,125,376 A | 9/2000 | Klarlund et al. | |
| 6,195,357 B1 | 2/2001 | Polcyn | |
| 6,208,839 B1 | 3/2001 | Davani | |
| 6,282,511 B1 | 8/2001 | Mayer | |
| 6,349,132 B1 | 2/2002 | Wesemann et al. | |
| 6,366,578 B1 | 4/2002 | Johnson | |
| 6,418,199 B1 | 7/2002 | Perrone | |

(Continued)

FOREIGN PATENT DOCUMENTS

| | | |
|---|---|---|
| EP | 0848373 | 6/1998 |
| EP | 1100013 | 5/2001 |

(Continued)

OTHER PUBLICATIONS

Hickey et al., "Multimodal Requirements for Voice Markup Languages", W3C Working Drafts, Jul. 10, 2000, 1-17.

(Continued)

*Primary Examiner* — Sam Bhattacharya
(74) *Attorney, Agent, or Firm* — Woodcock Washburn LLP

(57) ABSTRACT

A system for enabling multi-modal bookmarks comprises a bookmark repository coupled to two browsers. A user bookmarks content using a first browser, and a bookmark is stored in the bookmark repository. The user subsequently uses a second browser and requests that the bookmark be de-referenced to point the second browser to the bookmarked content. The second browser accesses the bookmark in the content repository and is directed to the bookmarked content. The first and second browsers may be visual and voice browsers that render Wireless Markup Language (WML) and Voice Extensible Markup Language (VXML) content, respectively, wherein a mapping is provided that links a given piece of visual content to an equivalent piece of voice content.

19 Claims, 2 Drawing Sheets

(56) References Cited

U.S. PATENT DOCUMENTS

| | | | |
|---|---|---|---|
| 6,424,945 | B1 | 7/2002 | Sorsa |
| 6,490,603 | B1 | 12/2002 | Keenan et al. |
| 6,570,966 | B1 | 5/2003 | Freeman et al. |
| 6,594,348 | B1 | 7/2003 | Bjurstrom et al. |
| 6,604,075 | B1 | 8/2003 | Brown et al. |
| 6,606,611 | B1 | 8/2003 | Khan |
| 6,757,718 | B1 | 6/2004 | Halverson et al. |
| 6,766,298 | B1 | 7/2004 | Dodrill et al. |
| 6,807,254 | B1 | 10/2004 | Guedalia et al. |
| 6,842,767 | B1 | 1/2005 | Partovi et al. |
| 6,983,307 | B2 | 1/2006 | Mumick et al. |
| 7,116,765 | B2 | 10/2006 | Summers et al. |
| 7,210,098 | B2 | 4/2007 | Sibal et al. |
| 7,289,606 | B2 | 10/2007 | Sibal et al. |
| 2001/0006890 | A1 | 7/2001 | Ryu |
| 2001/0018353 | A1 | 8/2001 | Ishigaki |
| 2001/0032234 | A1* | 10/2001 | Summers et al. ............ 709/201 |
| 2002/0095293 | A1 | 7/2002 | Gallagher et al. |
| 2002/0194388 | A1 | 12/2002 | Boloker et al. |
| 2003/0032456 | A1 | 2/2003 | Mumick et al. |
| 2003/0071833 | A1 | 4/2003 | Dantzig et al. |
| 2003/0162561 | A1 | 8/2003 | Johnson et al. |
| 2003/0179865 | A1 | 9/2003 | Stillman et al. |
| 2003/0187656 | A1 | 10/2003 | Goose et al. |
| 2003/0208472 | A1 | 11/2003 | Pham |
| 2004/0006474 | A1 | 1/2004 | Gong et al. |
| 2004/0034531 | A1 | 2/2004 | Chou et al. |
| 2005/0049862 | A1 | 3/2005 | Choi et al. |
| 2005/0203747 | A1 | 9/2005 | Lecoeuche |
| 2005/0273487 | A1 | 12/2005 | Mayblum et al. |
| 2005/0288063 | A1 | 12/2005 | Seo et al. |
| 2006/0165104 | A1 | 7/2006 | Kaye |
| 2006/0287845 | A1 | 12/2006 | Cross et al. |
| 2007/0260972 | A1 | 11/2007 | Anderl |
| 2008/0086564 | A1 | 4/2008 | Putman et al. |

FOREIGN PATENT DOCUMENTS

| | | |
|---|---|---|
| EP | 1423968 | 6/2004 |
| WO | WO 99/46920 | 9/1999 |
| WO | WO 99/55049 | 10/1999 |
| WO | WO 2004/014053 | 2/2004 |
| WO | WO 2007/130256 | 11/2007 |

OTHER PUBLICATIONS

Huang et al., "MIPAD: A next generation PDA Prototype", Proceedings of the International Conference on Spoken Language Processing, Beijing, China, Oct. 16, 2000, 1-4.

International Patent Application No. PCT/US2002/21058: International Search Report dated Dec. 16, 2002, 4 pages.

International Patent Application No. PCT/US2002/24885: International Search Report dated Nov. 26, 2002, 1 page.

International Patent Application No. PCT/US2007/009102: International Search Report dated Feb. 25, 2008, 2 pages.

International Patent Application No. PCT/US2007/009102: Written Opinion dated Feb. 25, 2008, 4 pages.

Kennedy et al., "HTML, The Definitive Guide, Third Edition", Copyright 1998, pp. 211-215.

Lau et al., "WebGALAXY: Beyond point and click—A Conversational Interface to a Browswer", Computer Networks and ISDN Systems, Sep. 1997, 29(8-13), 1385-1393.

Maes et al., "Multi-model Interaction in the age of information appliances", Multimedia and Expo, 2000, ICME 2000, 2000 IEEE International Conference on NY, NY, Jul. 30-Aug. 2, 2000, 1, 15-18.

Niklfeld et al., "Component-Based multimodal dialog interfaces for mobile knowledge creation", Proceedings of the ACL 2001 Workshop on Human Language Technology and Knowledge Management, Toulouse, France, Jul. 6-7, 2001, 1-8.

* cited by examiner

SYSTEM AND METHOD FOR PROVIDING MULTI-MODAL BOOKMARKS

CROSS REFERENCE TO RELATED APPLICATIONS

This application is a continuation of U.S. patent application Ser. No. 10/211,117, titled "System and Method for Providing Multi-Modal Bookmarks," filed Aug. 2, 2002, which claims the benefit of U.S. Provisional Application No. 60/310,610, entitled "System and Method for Providing Multi-Modal Bookmarks," filed Aug. 7, 2001, the entire contents of which are incorporated herein by reference.

TECHNICAL FIELD

The present invention relates generally to the field of telephony. More particularly, the invention provides a technique for providing multi-modal bookmarks. In accordance with exemplary aspects of the invention, a user who browses the web using a visual browser may bookmark a page, and that bookmark is later available to the user for browsing the web in voice mode.

BACKGROUND

As computer technology becomes more widely available, the transmission of voice information has become increasingly intertwined with the transmission of data. Thus, many telephones enable a user to interact with content either in an audio mode (i.e., using a speaker and microphone), or a visual mode (i.e., using a visual display and some type of input device such as a keypad).

One application of modern telephones is the use of the "wireless web." By using a telephone (e.g., a wireless telephone) with a WAP browser that renders Wireless Markup Language (WML) content, a user can access the Internet. Similarly, the user can also access the internet by telephone using a "voice browser" that allows a user to interact with Voice eXtensible Markup Language (VXML) content. Content is not always amenable to a single mode of communication. That is, in some cases it is most convenient to allow a user to interact with content either in voice mode or visual mode, rather than to restrict the user to a particular mode. An architecture that permits a user to interact with a single application (or item of content) in both voice and visual modes can be referred to as "multi-modal."

One problem that arises when a user wishes to access the web in both visual and voice modes is that a user may bookmark a page using a first browser (e.g., a visual browser), and, when the user accesses the web using a different browser (e.g., a voice browser), that page is no longer bookmarked, because the bookmark is accessible only by a particular browser.

In view of the foregoing, there is a need for a bookmark system that overcomes the drawbacks of the prior art.

SUMMARY

The present invention provides a system for storing bookmarks, such that the bookmarks can be accessed using a plurality of browsers. For example, a user may browse the wireless web with a visual browser (e.g., a WAP browser), and may bookmark a particular page. The bookmark is then stored in a bookmark repository, which is accessible to both the visual browser and a voice browser. When the same user browses the wireless web using a voice browser, the user may access the bookmark that was created with the visual browser. The content used with the visual browser need not be identical to the content used with the voice browser; a relationship may be defined that links bookmarked visual content with equivalent voice content. The use of bookmarks in the context of the wireless web, visual browsers, and voice browsers is merely exemplary; in accordance with the invention, bookmarks may be used in connection with content other than wireless web content, and in connection with applications other than visual and voice browsers.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The present invention provides a system and method whereby a user who browses content using a first browser (e.g., a visual browser) may bookmark a page such that the bookmark is available to the user for browsing the content with a second browser (e.g., a voice browser). For example, a user may bookmark a particular retail web site using a WAP browser, and then use the bookmark to access that page in a separate session with a voice browser.

Figure 1:
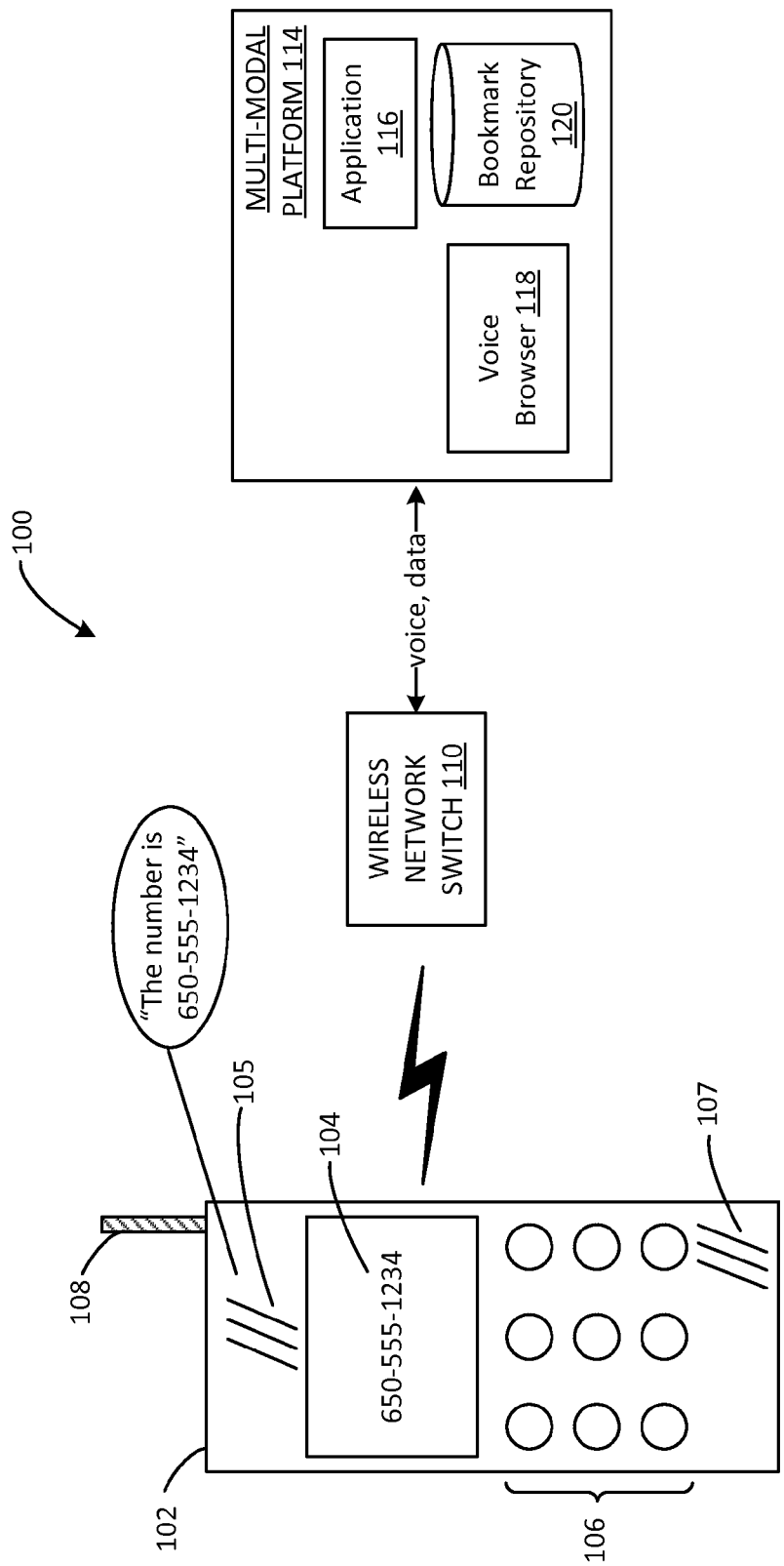
FIG. 1 is a block diagram of a telephone network architecture in which aspects of the invention may be implemented.

FIG. 1 shows a telephone network architecture 100. Architecture 100 includes a wireless telephone 102, a wireless network switch 110, and a multi-modal platform 114. While architecture 100 is shown, for exemplary purposes only, in the context of wireless telephony, it will be appreciated that the invention applies to any type of telephony or communications architecture including (but not limited to) wired telephony.

In a preferred embodiment, wireless telephone 102 comprises a visual display 104, an audio speaker 105, a keypad 106, a microphone 107, and an antenna 108. Visual display 104 may, for example, be a Liquid Crystal Display (LCD) which displays text and graphics. Audio speaker 105 renders audio signals (e.g., signals received from other components in architecture 100) in order to produce audible sound. Keypad 106 may be an alpha-numeric keypad that allows a user to input alpha-numeric characters. Depending upon context, wireless telephone may respond to input from keypad 106 by displaying appropriate characters on display 104, transmitting ASCII representations of such characters, or (in the case of numeric input) generating appropriate DTMF signals. Microphone 107 captures audio signals, which may, in one example, be digitally sampled by wireless telephone 102 for wireless transmission to other components of network architecture 100. Antenna 108 is used by wireless telephone 102 to transmit information to, and receive information from, components within architecture 100. For example, wireless telephone 102 may use antenna 108 to receive digital audio signals for rendering on speaker 105, to transmit digital audio signals captured by microphone 107, to receive data to be displayed on visual display 104, or to transmit data captured with keypad 106. Wireless telephone 102 may also contain computing components (not shown). For example, wireless telephone 102 may have a memory and a processor, which may be used to store and execute software (e.g., software that digitally samples audio signals captured with microphone 107, software that generates analog audio signals from digitally-sampled audio received through antenna 108, software that enables the browsing of content using visual display 104 and keypad 106, etc.). In one example, wireless telephone 102 may include a WAP browser that includes the capability to bookmark pages of the wireless web. The structure of a wireless telephone 102 that employs the components shown in FIG. 1 in connection with a memory and processor will be apparent to those of skill in the art, and thus is not discussed at length herein.

One feature of wireless telephone 102 is that it can be viewed as having two different "modes" of communication. On the one hand, wireless telephone 102 communicates in a "voice" mode; on the other hand, wireless telephone 102 communicates in a "visual" mode. In voice mode, wireless telephone uses microphone to capture audio (which may be digitally sampled and then transmitted through antenna 108), and uses speaker to render audio (which may be received through antenna 108 in a digital form). "Voice" mode is exemplified by the conventional usage of a telephone in which a first party uses the telephone to engage in two-way speech with another party. In "visual" mode, wireless telephone uses keypad 106 to capture data (e.g., alpha-numeric data which may be represented in ASCII form), and uses visual display 104 to render data. The captured data may be transmitted through antenna 108, and antenna 108 may also be used to receive the data that is to be displayed on visual display 104.

Wireless telephone 102 communicates with a wireless network switch 110. Wireless network switch is coupled to a tower (not shown) that engages in two-way communication with wireless telephone 102 through antenna 108. Wireless network switch 110 connects wireless telephone 102 to various components, such as multi-modal platform 114, or Public Switched Telephone Network (PSTN) (not shown). Multi-modal platform 114 is described in further detail below; a PSTN is known in the art and thus is not described herein.

In accordance with aspects of the invention, multi-modal platform 114 may facilitate communication with wireless telephone 102 in two "modes" (i.e., in voice mode and visual mode). For example, multi-modal platform 114 may be adapted to send audio information to and receive audio information from wireless telephone 102 through switch 110 using a voice channel. Multi-modal platform 114 may likewise be adapted to send visual data to and receive visual data from wireless telephone 102 through switch 110 using a data channel. Moreover, multi-modal platform 114 may be adapted to change between these two "modes" of communicating according to instructions or existing communications conditions. Multi-modal platform 114 may be embodied as a computing device programmed with instructions to perform these functions.

Multi-modal platform 114 may be or comprise a computing device that includes various types of processing capability and storage. In one example, multi-modal platform includes an application engine 116. Application engine 116 is software that provides content to a user—either content located on multi-modal platform, or content that is generated elsewhere (e.g., at a web site provider's computing device). Application engine 116 provides the content either in a voice form or a visual form, depending on which mode is appropriate for telephone 102 to interact with the content. (The "appropriateness" of a particular mode may be determined by an express user instruction, an instruction from the underlying application, or some analysis of the operating conditions that weigh in favor of one mode or another.)

Figure 2:
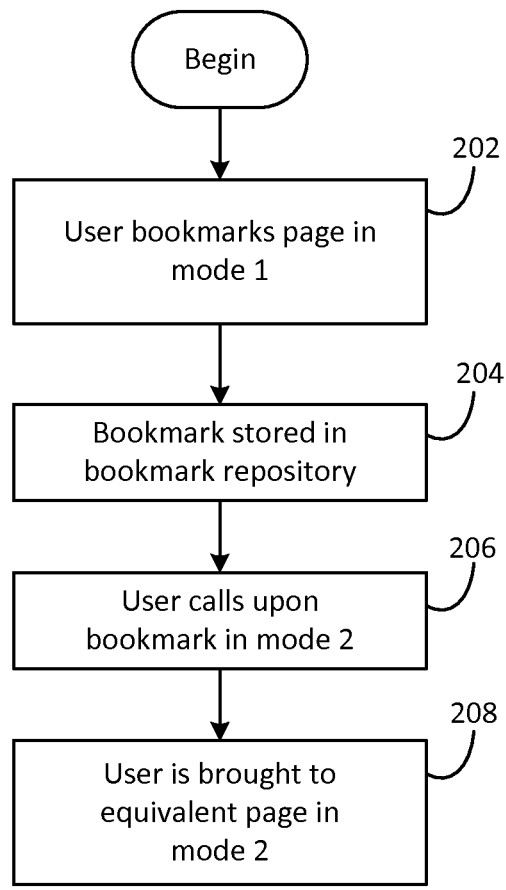
FIG. 2 is a flow diagram of an exemplary bookmark process in accordance with aspects of the invention.

Multi-modal platform 114 may include, or be associated with, bookmark repository 120. As noted above, telephone 102 may include a WAP browser that allows a user to browse the wireless web and to bookmark content therein. An exemplary process of bookmarking a page is described with reference to both FIG. 1 and FIG. 2.

In one embodiment, when the user bookmarks a page (FIG. 2, block 202), the bookmark is stored in bookmark repository 120 (block 204). That is, executing a bookmark function on telephone 102's WAP browser causes telephone 102 to generate data indicative of the bookmark, and to communicate this data to bookmark repository 120 (e.g., by using antenna 108 to transmit this data to multi-modal platform 114 via wireless network switch 110).

Bookmark repository 120 is accessible to voice browser 118. Thus, if the user, subsequent to bookmarking a page as described above, engages in a browsing session using voice browser 118, the user may call upon the bookmark and return to the bookmarked page (block 206). Thus, since bookmark repository 118 is accessible to both the visual browser and the voice browser, the user can access the same set of bookmarks regardless of whether he is browsing in voice mode or visual mode. If the user calls upon the bookmark in a mode that is different from the mode in which he originally generated the bookmark, the user will be brought to an equivalent page in the new mode (block 208), as more particularly described below.

It will be appreciated that not all visual content has an exact analogue in voice, and vice versa. Thus, a mapping may be created that links visual content with equivalent voice content, such that every bookmark (or at least a subset of all potential bookmarks) has a defined meaning for both visual and voice browsing. The nature of this mapping depends on the relationship between visual and voice content. Every bookmark also is itself multimodal and can be accessed in both voice and visual modes.

In one example, every visual page has an equivalent voice page (e.g., a content provider provides a given page of content in both Wireless Markup Language (WML) and in Voice eXtensible Markup Language (VXML)). In another example, every Universal Record Locator (URL) points to plural pages written in various markup languages, and every GET request for a URL includes an identification of the type of browser that generated the request. In this case, no mapping is necessary, since the server at which the URL is located provides a different page based on what type of browser is identified in the GET request. In yet another example, a complex relationship between visual and voice content is defined, such that every bookmark entered in one mode will have meaning in the other mode, even if there is no obvious canonical relationship between voice and visual content pages. One context in which this type of mapping may be necessary is if a bookmark generated in WML or VXML is to have meaning for Hypertext Markup Language (HTML) content, since HTML content is often structured differently from its WML or VXML counterparts.

According to one feature of the invention, bookmark repository 120 may maintain a hierarchical structure of bookmarks, as specified by the user. Thus, if a user organizes bookmarks in folders (e.g., "sports," "music," etc.), the voice system may provide menus based on this hierarchical structure. Alternatively, a user may be able to speak the name of a bookmark, which bypasses the menus that support the hierarchical structure (or queries the user as to which sub-tree of the hierarchical structure the user intended, if two bookmarks have a common, non-unique name).

According to another feature of the invention, a bookmark may specify a preferred "mode" for interacting with the bookmark. In other words, the bookmark may be stored in a data structure that includes, as one of its fields, a specification of mode (e.g., voice or visual), wherein, upon re-directing to the bookmarked content, multi-modal platform 114 switches to the mode specified in the bookmark. One variation on this design is that platform 114 may take into account the specified mode, but may override it based on a variety of factors (e.g., the unavailability of the specified mode, overriding instructions generated by the applications that provides the content, an overriding instruction from a user, etc.) Another variation on this design is to allow the user to specify the preferred mode as being the mode that the user is currently using at the time the bookmark is accessed.

According to another feature of the invention, bookmarks may be sent by a browser to bookmark repository 120 either continuously (i.e., as they are generated by the user), or in a "batch" mode (i.e., once per hour, once per day, once per week, etc.). The repository 120 allows for persistence. In a variation on the invention, repository 120 may be situated at the wireless telephone 102.

According to another feature of the invention, bookmarks may be "annotated." That is, the user may provide his or her own description of the bookmark. As one example, the user may type the description when bookmarking content in visual mode, and this description may be "read" (e.g., by a voice synthesis system) when the user accesses the bookmark in voice mode.

While the foregoing examples have been provided in the context of wireless telephony, it should be noted that the above-described system can also be deployed in any communications context, such as a wired telephone system. For example, wireless telephone switch 110 can be a wired-network telephone switch, such as a "5E," and wireless telephone 102 may be embodied as an wired telephone that is enabled to receive both voice and data.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A system for storing bookmarks, the system comprising a processor and memory, the system configured to:
    communicate, over a communications network, with a plurality of mobile devices configured to operate in one or more user input modes;
    receive, over the communications network from a first mobile device configured to execute a first browser, data indicative of a web document;
    store the data in a bookmark repository communicatively coupled to the system;
    receive, over the communications network from a second mobile device configured to execute a second browser, a request to access the data; and
    in response to the request, retrieve the data stored in the bookmark repository and transmit the data to the second mobile device over the communications network, wherein the first browser is configured to enable the browsing of the web document in a first user input mode based on a relationship for linking the web document in the first user input mode with an equivalent web document in a second user input mode, the second browser is configured to allow a user to access the data regardless of whether the second browser is configured to execute in the first or second user input mode, and the second browser is configured to use the data to navigate to the equivalent web document.

2. The system of claim 1, wherein the first and second mobile devices are configured to operate using a plurality of modes of user input.

3. The system of claim 1, wherein the data includes identification of a user input mode used by the first browser at a time the bookmark is stored.

4. The system of claim 1, wherein the bookmark repository comprises a hierarchical structure of bookmarks comprising folders.

5. The system of claim 4, wherein the second browser is configured to render a graphical depiction of bookmarks based on the hierarchical structure.

6. The system of claim 1, wherein the system is further configured to receive a textual annotation describing the bookmark.

7. The system of claim 1, wherein the bookmark repository stores annotative data descriptive of the web document.

8. The system of claim 1, wherein the system is further configured to authenticate a user associated with the second mobile device prior to communicating the data.

9. A non-transitory computer readable storage medium having computer executable instructions stored thereon, the instructions comprising:
    instructions for receiving, from a first computing device executing a first browser, at least one bookmark comprising data indicative of one or more web documents, the at least one bookmark associated with a user;
    instructions for communicating with a data store storing thereon a bookmark repository and allowing contents of the bookmark repository to be accessed by a plurality of computing devices over a communications network;
    instructions for storing the at least one bookmark in the bookmark repository;
    instructions for receiving, from a second computing device configured to execute a second browser, a request for bookmarks associated with the user and stored in the bookmark repository; and
    instructions for, in response to the request, determining that the request is associated with the user and sending the at least one bookmark to the second computing device configured to execute the second browser, wherein the second browser is operable to navigate to the one or more web documents using the at least one bookmark.

10. A method of synchronizing bookmarks comprising:
    receiving, over a communications network from a first computing device executing a first browser, one or more bookmarks comprising data indicative of one or more web documents, the one or more bookmarks being linked to a user;

storing the one or more bookmarks and information indicative of the user in a bookmark repository accessible to a multimodal platform, the bookmark repository configured to store a plurality of bookmarks and accessible, over the communications network, to a plurality of computing devices;

receiving, over the communications network from a second computing device executing a second browser, a request for the one or more of the user's bookmarks that are stored in the bookmark repository and data indicating that the request is associated with the user; and in response to confirmation of the received data, sending the requested one or more bookmarks to the second computing device over the communications network, wherein the second browser configured to execute on the second computing device is configured to navigate to the one or more web documents using the one or more bookmarks.

11. The method of claim 10, wherein the confirmation comprises authenticating the user.

12. The method of claim 10, further comprising receiving, over the communications network from a third computing device configured to execute a third browser, a request for the one or more of the user's bookmarks that are stored in the bookmark repository and data indicating that the request is associated with the user; and in response to confirmation of the received data, sending the one or more of the user's bookmarks to the third computing device configured to execute the third browser.

13. The method of claim 10, wherein the bookmarks are associated with a user identifier.

14. A method of accessing a bookmark, comprising:

sending a request to access a bookmark to a bookmark repository, the request sent over a communications network from a first browser configured to execute on a first computer, the bookmark associated with a user and comprising data indicative of a web document, the bookmark having previously been sent to the bookmark repository via a second browser configured to execute on a second computer and stored in the bookmark repository, the bookmark repository stored in a data store accessible by a computing device; and communicating, by the computing device, the bookmark to the first browser via the communications network, wherein the first browser is configured to navigate to the web document using the bookmark.

15. The method of claim 14, wherein the bookmark repository comprises a hierarchical structure of bookmarks comprising folders.

16. The method of claim 15, wherein the second browser is configured to render menus based on the hierarchical structure.

17. The method of claim 14, wherein the bookmark comprises annotative data descriptive of the web document.

18. The method of claim 14, further comprising authenticating the user prior to communicating the bookmark.

19. The method of claim 14, wherein the request is sent automatically in response to execution of the first browser.

* * * * *

UNITED STATES PATENT AND TRADEMARK OFFICE
CERTIFICATE OF CORRECTION

PATENT NO. : 8,571,606 B2  
APPLICATION NO. : 13/491465  
DATED : October 29, 2013  
INVENTOR(S) : Mumick et al.

Page 1 of 1

It is certified that error appears in the above-identified patent and that said Letters Patent is hereby corrected as shown below:

On Title Page 2, item (56), under "OTHER PUBLICATIONS", in Column 2, Line 15, delete "Browswer"," and insert -- Browser", --, therefor.

In the Specifications

In Column 4, Lines 24-25, delete "bookmark repository 118" and insert -- bookmark repository 120 --, therefor.

In Column 5, Line 40, delete "an wired" and insert -- a wired --, therefor.

Signed and Sealed this  
First Day of April, 2014

Michelle K. Lee  
*Deputy Director of the United States Patent and Trademark Office*